(12) United States Patent
Ergen et al.

(10) Patent No.: US 11,122,446 B2
(45) Date of Patent: Sep. 14, 2021

(54) METHOD AND SYSTEM FOR MANAGING A PLURALITY OF WI-FI ACCESS POINTS CONSIDERING BACKHAULS AND ENERGY CONSUMPTION USING A CLOUD BASED ADAPTIVE SOFTWARE DEFINED NETWORK

(71) Applicant: Ambeent Wireless Bilişim ve Yazilim A.Ş, Istanbul (TR)

(72) Inventors: Mustafa Ergen, Istanbul (TR); Hasan Şildir, Istanbul (TR); Sinem Çöleri Ergen, Istanbul (TR)

(73) Assignee: Ambeent Inc., Istanbul (TR)

( * ) Notice: Subject to any disclaimer, the term of this patent is extended or adjusted under 35 U.S.C. 154(b) by 0 days.

(21) Appl. No.: 15/937,820

(22) Filed: Mar. 27, 2018

(65) Prior Publication Data

US 2021/0127278 A1     Apr. 29, 2021

Related U.S. Application Data

(60) Provisional application No. 62/601,534, filed on Mar. 27, 2017.

(51) Int. Cl.
| | | |
|---|---|---|
| *H04W 24/02* | (2009.01) |
| *H04W 88/08* | (2009.01) |
| *H04W 24/06* | (2009.01) |
| *H04W 24/08* | (2009.01) |
| *H04W 16/18* | (2009.01) |

(Continued)

(52) U.S. Cl.
CPC .......... *H04W 24/02* (2013.01); *G06N 5/003* (2013.01); *H04W 16/18* (2013.01); *H04W 24/08* (2013.01); *H04W 28/06* (2013.01); *H04W 88/08* (2013.01)

(58) Field of Classification Search
CPC ..... H04W 24/02; H04W 24/04; H04W 24/08; H04W 24/06; H04W 88/08; H04W 88/085; H04W 88/10; H04W 16/18; H04W 16/22; H04W 28/06; G06N 5/003
See application file for complete search history.

(56) References Cited

U.S. PATENT DOCUMENTS

| | | | | |
|---|---|---|---|---|
| 2010/0323704 A1* | 12/2010 | Tailor | ............... | H04W 36/32 |
| | | | | 455/438 |
| 2015/0237519 A1* | 8/2015 | Ghai | ............... | H04L 63/0892 |
| | | | | 380/270 |

(Continued)

*Primary Examiner* — Candal Elpenord
(74) *Attorney, Agent, or Firm* — Farrell Patent Law PC; Mark Farrell (57) ABSTRACT

The invention provides a method and system for managing a plurality of Wi-Fi access points using a cloud based adaptive software defined network (A-SDN). The measurement data corresponding to a plurality of network variables are collected from one or more Wi-Fi access points and one or more client devices. Once the measurement data are collected, optimal operating channels and optimal transmit power for the one or more Wi-Fi access points are derived based on one or more network variables, backhaul limits corresponding to the one or more Wi-Fi access points and a download behavior of the one or more client devices using a real-time optimization. The real-time optimization includes deriving the optimal settings through heuristic solutions of an optimization problem formulated as a Mixed Integer Nonlinear Programming (MINLP) and a machine learning based optimization.

25 Claims, 5 Drawing Sheets

(51) Int. Cl.
*G06N 5/00* (2006.01)
*H04W 28/06* (2009.01)

(56) References Cited

U.S. PATENT DOCUMENTS

2016/0338075 A1* 11/2016 McKibben ............ H04W 24/08
2017/0272317 A1* 9/2017 Singla ................. H04L 41/0806
2017/0272963 A1* 9/2017 Rengarajan ........... H04W 24/02
2018/0176824 A1* 6/2018 Savarimuthu ........... H04L 67/10

* cited by examiner

METHOD AND SYSTEM FOR MANAGING A PLURALITY OF WI-FI ACCESS POINTS CONSIDERING BACKHAULS AND ENERGY CONSUMPTION USING A CLOUD BASED ADAPTIVE SOFTWARE DEFINED NETWORK

FIELD OF THE INVENTION

The invention generally relates to automatically managing a plurality of Wi-Fi access points using a cloud platform. More specifically, the invention relates to remotely managing and controlling the Wi-Fi access points using a cloud based adaptive software defined network (A-SDN) that adaptively manages adjustable parameters of the plurality of Wi-Fi access points and enables the plurality of Wi-Fi access points to operate at real-time optimal performance considering backhauls and energy consumption in addition to user demands and signal interference.

BACKGROUND OF THE INVENTION

Wi-Fi networks are formed using one or more Wi-Fi access points that support a connection of multiple wireless devices to a wired connection for access to the Internet. The Wi-Fi networks are growing larger by densely deploying the Wi-Fi access points in places such as, but not limited to, residential spaces, apartments, office buildings and public spaces.

Current Wi-Fi access points operate in an inefficient manner due to a decentralized managing structure and lack of self-organizing network (SON) feature. Also, current Wi-Fi network architectures suffer from the collisions of random access mechanism due the uncoordinated transmission from a large number of users at the same frequency, which hinders the efficient use of available theoretical capacity and resources. The communication among the network elements is also inefficient without SONs, primarily due to the limited channel availability, interference among the signals, limited adaptation to network topology changes and excessive battery consumption.

Moreover, dense Wi-Fi networks operate in an inefficient manner due to decentralized structure. Thus, optimization of dense Wi-Fi networks requires centralized and coordinated decisions despite environmental disturbances and highly volatile data transaction rates. Also, to obtain a realistic image of the trends in the network, vast amount of data need to be monitored and processed, which results in big data management. Once the key network variables such as fairness index, average network capacity, energy consumption per bit of data delivery are determined, the remaining network variables should be processed for data reduction and definition of optimization problem.

Usually, in large and complex systems, some process variables have high correlation and, in that case, monitoring each variable does not bring additional information to a decision maker which requires choosing a representative and independent set of process variables.

Therefore, in light of the above, there is a need for a method and system for optimizing overall performance of Wi-Fi access points using a cloud-based management mechanism, thus providing improved performance and flexibility to control the Wi-Fi access points.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION OF THE INVENTION

Before describing in detail embodiments that are in accordance with the invention, it should be observed that the embodiments reside primarily in combinations of method steps and system components related to remotely managing and controlling the Wi-Fi access points using a cloud based adaptive software defined network (A-SDN) that enables the Wi-Fi access points to operate at real-time optimal performance considering backhauls and energy consumption in addition to user demands and signal interference.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for managing a plurality of Wi-Fi access points using a cloud based adaptive software defined network (A-SDN). In order to manage the plurality of Wi-Fi access points, measurement data corresponding to a plurality of network variables are collected from one or more Wi-Fi access points and one or more client devices using a cloud based network application. Once the measurement data are collected, a first optimal setting for a first decision variable and a second optimal setting for a second decision variable are derived for the one or more Wi-Fi access points based on one or more network variables of the plurality of network variables, backhaul limits corresponding to the one or more Wi-Fi access points and a download behavior of the one or more client devices using a real-time optimization. The first decision variable is an operating channel selection for the one or more Wi-Fi access points and the second decision variable is a transmit power of the one or more Wi-Fi access points. Thus, the method of deriving the optimal settings for the one or more Wi-Fi access points includes the determination of optimal operating channels and an optimal transmit power for the one or more Wi-Fi access points, which are calculated through heuristic solutions of an optimization problem formulated as a Mixed Integer Nonlinear Programming (MINLP) and a machine learning based optimization.

Figure 1:
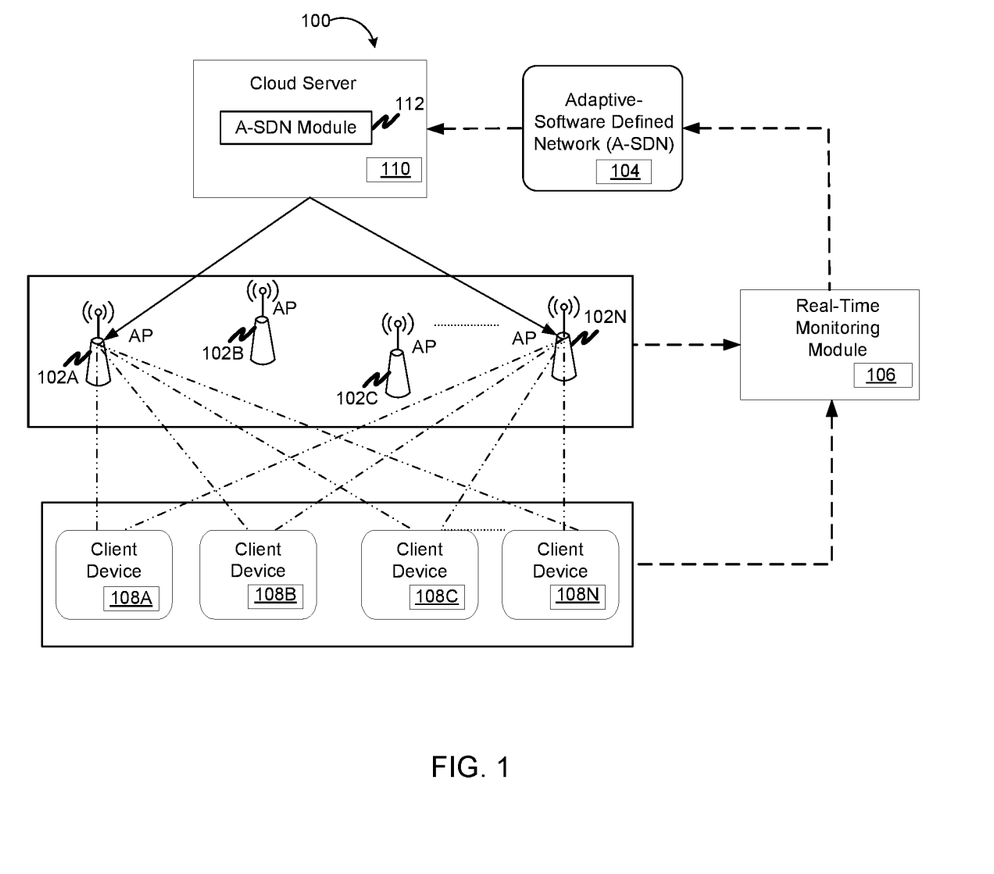
FIG. 1 illustrates a system for managing a plurality of Wi-Fi access points using an adaptive software defined network (A-SDN) in accordance with an embodiment of the invention.

FIG. 1 illustrates a system 100 for managing a plurality of Wi-Fi access points 102A-102N using an adaptive software defined network (A-SDN) 104 in accordance with an embodiment of the invention.

As illustrated in FIG. 1, system 100 includes a real-time monitoring module 106 which is communicatively coupled to plurality of Wi-Fi access points 102A-102N, a plurality of client devices 108A-108N and a cloud server 110.

Plurality of Wi-Fi access points 102A-102N are deployed in places such as, but not limited to, homes, enterprises and public spaces. Plurality of client devices 108A-108N are user devices such as, but not limited to, a mobile device, a personal digital assistant, a computer, a laptop, a smart phone and a tablet.

Cloud server 110 includes an adaptive software defined network (A-SDN) module 112 that communicates with A-SDN 104 and acts as a centralized structure for the smart management of plurality of Wi-Fi access points 102A-102N.

In order to manage a Wi-Fi access point 102A of plurality of Wi-Fi access points 102A-102N, real-time monitoring module 106 collects measurement data corresponding to a plurality of network variables from plurality of Wi-Fi access points 102A-102N and plurality of client devices 108A-108N.

The plurality of network variables can be, but need not be limited to, an access point average access delay, an average access delay for each access category, an associated client device count, a channel utilization, a transmitted fragment count, a group addressed transmitted frame count, a failed count, a retry count, a multiple retry count, a frame duplicate count, a request to send (RTS) count, an RTS failure count, an acknowledge (ACK) failure count, a received fragment count, a group addresses received frame count, a frame check sequence (FCS) error count, a transmitted frame count, a received signal strength indicator (RSSI) on a client device and a total data transfer. Further, the primary network variables include, but need not be limited to, the total data transfer, channel utilization, client device counts and RSSI on client devices. A frequency of monitoring the plurality of network variables is inversely proportional to a time constant of network dynamics.

Among the network variables mentioned above, the primary network variables that are to be monitored are the total data transfer; channel utilization, the associated client device counts and the RSSI on client devices.

Real-time monitoring module 106 obtains online measurements from plurality of Wi-Fi access points 102A-102N and plurality of client devices 108A-108N through a Cloud Based Network (CBN) application and delivers the online measurements to cloud server 110 at variable and adaptable frequencies.

For collecting the measurement data, real-time monitoring module 106 adapts a data importing frequency based on a transition profile of the plurality of network variables, the disturbance from environmental Wi-Fi access points and the cloud performance. Real-time monitoring module 106 monitors a combination of the primary network variables with high frequency because it is defined as an indication of overall process variation.

Once the measurement data corresponding to the plurality of network variables are collected, the measurement data are fed into A-SDN module 112 and processed at variable and adaptable frequencies.

A-SDN module 112 then processes the measurement data and derives a first optimal setting of a first decision variable for Wi-Fi access point 102A and a second optimal setting of a second decision variable for Wi-Fi access point 102A based on one or more network variables of the plurality of network variables, a backhaul limit corresponding to Wi-Fi access point 102A and a download behavior of one or more client devices of plurality of client devices 108A-108N using a real-time optimization.

The first decision variable is an operating channel selection for Wi-Fi access point 102A and the second decision variable corresponds to a transmit power of Wi-Fi access point 102A. Thus, the method of deriving the optimal settings for Wi-Fi access point 102A includes the determination of optimal operating channels and an optimal transmit power for Wi-Fi access point 102A, which are calculated through heuristic solutions of an optimization problem formulated as a Mixed Integer Nonlinear Programming (MINLP) and a machine learning based optimization.

Additionally, optimal settings of other decision variables for Wi-Fi access point 102A may also be derived in A-SDN module 112, the other decision variables being an RTS/CTS threshold, a fragmentation threshold, a beacon interval, a delivery traffic indication (DTI) interval, an 802.11 mode, an 802.11 protection, an operating channel bandwidth, a WAN managed upstream bandwidth and LAN managed downstream bandwidth. A-SDN module 112 for deriving the optimal settings pertaining to decision variables for Wi-Fi access point 102A is further described in detail in conjunction with FIG. 2.

Further, A-SDN module 112 monitors changes in the primary network variables based on the measurement data received from real-time monitoring module 106.

If there are changes in the primary network variables, real-time monitoring module 106 issues a fault warning that causes A-SDN module 112 to initiate a re-optimization process that recalculates an optimal setting for Wi-Fi access point 102A, in addition to the delivery of the data up to that specific time, reducing the data transfer cycle. The frequency of the monitoring sampling is inversely proportional to a time constant of network dynamics. The various sources that cause the re-optimization to occur include, but are not limited to, changes in the data transfer rates, changes in the network management policy and measurable and immeasurable disturbances.

On the other hand, if there are no significant changes in the primary network variables, A-SDN module 112 does not re-calculate optimal setting profiles for Wi-Fi access point 102A.

Figure 2:
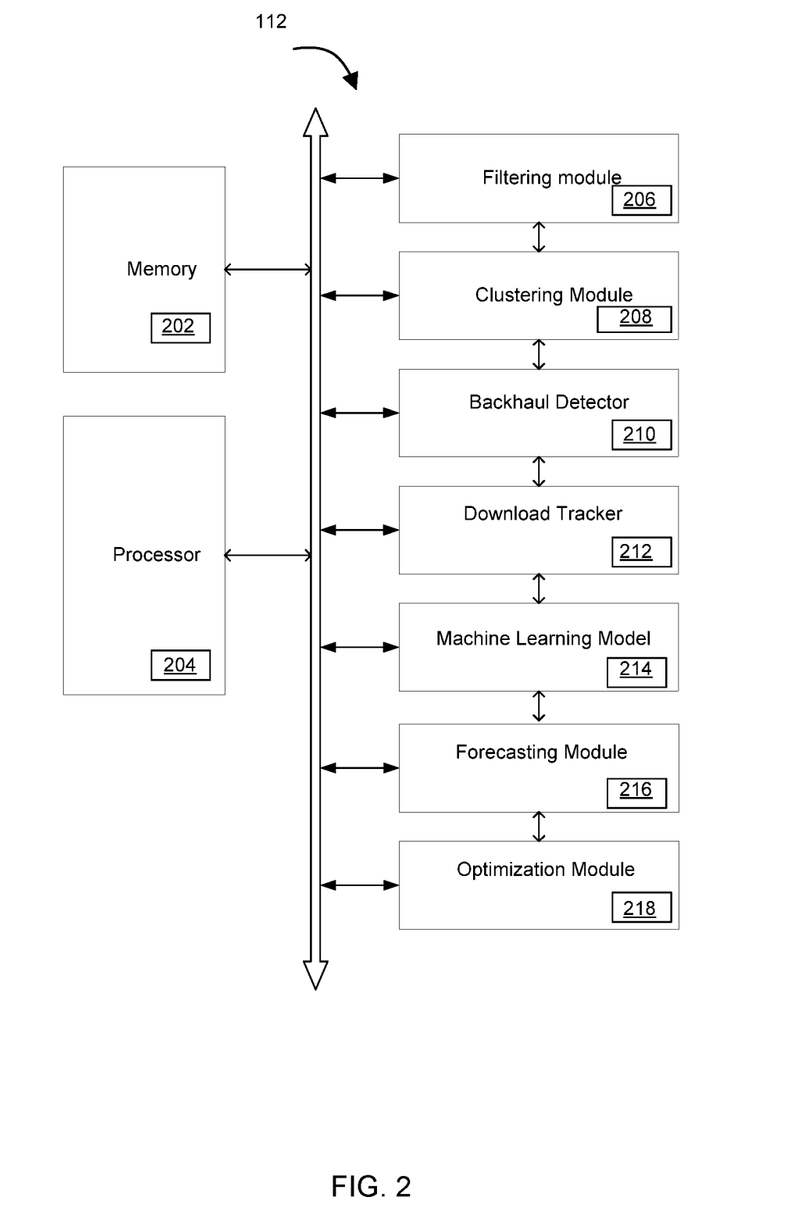
FIG. 2 illustrates an A-SDN module of a cloud server for managing a plurality of Wi-Fi access points in accordance with an embodiment of the invention.

FIG. 2 illustrates A-SDN module 112 of cloud server 110 for managing plurality of Wi-Fi access points 102A-102N in accordance with an embodiment of the invention.

As illustrated in FIG. 2, A-SDN module 112 includes a memory 202, a processor 204 communicatively coupled to memory 202. Memory 202 and processor 204 are communicatively coupled to various components of A-SDN module 112.

The measurement data corresponding to the plurality of network variables collected by real-time monitoring module 106, are fed into a filtering module 206 of A-SDN-module 112. Filtering module 206 filters the plurality of network variables to eliminate a channel and an environmental noise. Further, filtering module 206 filters outlier measurements and extracts a representative pattern of the plurality of network variables through smoothing of past measurements. A selected subset of correlated variables from the set of correlated variables are then fed into clustering module 208. The subset of correlated variables has a relatively lower condition number of a covariance matrix.

Clustering module 208 then clusters the subset of correlated variables based on various criteria, such as, but not limited to, a location of a network element, wherein distinct networks do not show interference and do not affect each other, an access point property, wherein some network elements have specific properties such as IEEE 802.11 standard of a Wi-Fi access point and influence overall network characteristics such as channel binding, and a network element volatility, wherein some network elements are more volatile in data transfer and topology, and thus the decision making process has to be more frequent.

Also, the subset of correlated variables is clustered to speed up computations and efficient control actions required for managing plurality of Wi-Fi access points 102A-102N. Additionally, a size and structure of the cluster varies in accordance with the availability of new measurement data.

The clustering of network elements is then applied to the measurement data from plurality of Wi-Fi access points 102A-102N and plurality of client devices 108A-108N. Thus, the optimization problem is solved for individual cluster of network elements to speed up the computations and efficient control actions. The size and structure of the clusters change as new data become available.

Moving on, A-SDN module 112 includes a backhaul detector 210 that detects backhaul limits associated with Wi-Fi access point 102A. In an embodiment, one or more client devices of plurality of client devices 108A-108N that are in contact with Wi-Fi access point 102A are used to infer the backhaul limits through an embedded speed test algorithm running in a mobile application or software installed on the one or more client devices.

Further, A-SDN module 112 includes a download tracker 212 that is installed as a pre-designed application or software in plurality of Wi-Fi access points 102A-102N and plurality of client devices 108A-108N, for enabling an internet connection. Download tracker 212 tracks a download behavior associated with plurality of client devices 108A-108N as a function of time in order to upload this information to cloud server 110 for later analysis through integration with a network adapter of a corresponding client device.

A-SDN module 112 further includes a machine learning model 214 that extracts download behavior or patterns associated with plurality of client devices 108A-108N from download tracker 212 that includes historical data. Machine learning model 214 clusters and forecasts the elements based on the extracted download behavior or patterns for optimization problem formulations. Machine learning model 214 evolves as network data becomes available.

Further, a forecasting module 216 present in A-SDN module 112 forecasts network dynamics based on density at Wi-Fi access point 102A. An average data demand profile is calculated with less and periodic measurements based on the network dynamics and a statistical database is created for future predictions. Forecasting module 216 further employs interference minimization as a suboptimal approach due to limited channel availability as high demands may concentrate on the overlapping bands, resulting in inefficient use of available channels. Thus, forecasting is essential as the network setting change has a significant cost and an implemented set of settings should sustain a satisfactory network performance for a certain amount of time. The probable actions are calculated based on historical network measurements and structure.

Thereafter, an optimization module 218 of A-SDN module 112 derives the optimal operating channels for Wi-Fi access point 102A and the optimal transmit power for Wi-Fi access point 102A based on the one or more network variables from clustering module 208, backhaul limits corresponding to Wi-Fi access point 102A from backhaul detector 210 and the download behavior or patterns of the one or more client devices of plurality of client devices from machine learning model 214, including the forecasted data from forecasting module 216, using a two-step optimization process. The two-step optimization process is performed through heuristic solutions of an optimization problem formulated as a MINLP and a machine learning based optimization.

The optimization problem is solved for a time horizon in order to derive the optimal operating channels and the optimal transmit power for Wi-Fi access point 102A.

In an embodiment, optimization module 218 derives the optimal transmission channel settings by solving a real-time optimization problem formulated as a MINLP, that considers practical aspects of dynamic horizon network behavior. In other embodiments, semi-empirical approximations are used to define the real-time optimization problem.

The process of formulation of the optimization problem and solving the optimization problem in accordance with the embodiment are explained in detail as follows.

The calculation of data rate from $i^{th}$ Wi-Fi access point to $j^{th}$ client device, DR(i, j), requires data on the interactions of network elements that are characterized by the RSSI measurements within the network. The RSSI matrix is defined by:

$$RSSI = \begin{bmatrix} RSSI_{APs-APs} & RSSI_{APs-STAs} \\ RSSI_{STAs-APs} & RSSI_{STAs-STAs} \end{bmatrix} \quad (1)$$

$RSSI_{APs-APs}$ is the RSSI matrix between Wi-Fi access points where element $RSSI_{APs-APs}(i, j)$ represents the RSSI from Wi-Fi access point i to Wi-Fi access point j. The RSSI matrix is obtained through a monitoring node of the Wi-Fi access points. $RSSI_{STAs-APs}$ represents the interference from all the Wi-Fi access points on a particular client device, where element $RSSI_{STAs-APs}(i, j)$ represents RSSI from $i^{th}$ Wi-Fi access point on client device j. In general, $RSSI_{APs-APs}$ and $RSSI_{STAs-APs}$ are the primary sources of data rate reduction and the impact is calculated through signal-to-interference-plus-noise ratio (SINR), determining the modulation based on a type of Wi-Fi access point.

$RSSI_{STAs-STAs}$ represents the interaction between client devices and is an essential consideration when uploading and when hidden node issues become an important concern. $RSSI_{STAs-STAs}$ is constructed through sniffing Radio Frequency (RF) media from client devices and has less impact on overall performance when the client devices are usually downloaders.

The data rate is then determined from an accurate estimation of SINR. For the SINR estimation, in addition to RSSI in Equation 1, the transmission channels of the Wi-Fi access points are also taken into consideration. Accordingly, the SINR estimation is given by the following equation:

$$SINR_{STAs-APs}(i,j) = \frac{RSSI_{STAs-APs}(i,j)}{\sum_{k=1, k\neq i}^{N} RSSI_{STAs-APs}(k,j) O(AP_{I,k}, AP_{I,i}) + \text{Noise}}} \quad (2)$$

where $SINR_{STAs-APs}(i, j)$ is the SINR of a particular client device j which is connected to $i^{th}$ Wi-Fi access point, $O(AP_{I,k}, AP_{I,i})$ is the overlapping coefficient that is calculated from a fractional bandwidth overlap between occupied channels of $i^{th}$ Wi-Fi access point and occupied channels of $k^{th}$ Wi-Fi access point, '$AP_I$' is a vector (dimension N) of integer Wi-Fi access point variables that includes a channel number and '$AP_{I,i}$' represents $i^{th}$ discrete Wi-Fi access point variable. $O(AP_{1,i}, AP_{I,j})$ is independent of a network structure and becomes zero for non-overlapping channels. Further, this includes channels from both 2.4 GHz and 5 GHz band.

Once the SINR is calculated for a particular client device, the corresponding maximum data rate is computed, whose values are described by the function DR(i, j), $$DR(i,j) = f_{SINR-DR}(SINR_{STAs-APs}(i,j), \text{TYPE}) \quad (3)$$

where $f_{SINR-DR}$ is the stepwise function which relates SINR to the corresponding data rate for a particular IEEE 802.11 standard, TYPE, for the same bandwidth. DR(i, j) from Equation 3 does not explicitly account for channel bonding, which further increases the data rate but is inherently taken into account while setting the transmission channels.

Once the maximum data rate from $i^{th}$ Wi-Fi access point to $j^{th}$ client device is computed, optimization module 218 then formulates the optimization problem. The optimization problem is given by:

$$\min_{CH_1, CH_2, K, CH_N} -\sum_{t=1}^{t_N} \sum_{i=1}^{N} \left( \min\left(\sum_{j=1}^{STA_i} DR(i, j, t), BH(i)\right)\right)^2 + \quad (4)$$

$$\gamma \sum_{t=1}^{t_N} \sum_{i=1}^{N} \sum_{j=1}^{STA_i} (H(D(i, j, t) - DR(i, j, t)) \cdot (D(i, j, t) - DR(i, j, t)))^2$$

s.t.

$h(CH_1, CH_2, K, CH_N, t) = 0$ $g(CH_1, CH_2, K, CH_N, t) \leq 0$ $CH_i \in CH_{i,TYPE}, i = 1, K, N$ where $STA_i$ is the number of client devices connected to $i^{th}$ Wi-Fi access point, DR(i, j, t) is the maximum data rate from $i^{th}$ Wi-Fi access point to $j^{th}$ client device at a particular time t, D(i, j, t) is the data demand of $j^{th}$ client device from $i^{th}$ Wi-Fi access point at a particular time t, BH(i) is the backhaul limit of $i^{th}$ Wi-Fi access point, H is the Heaviside step function which returns one if its parameter is a positive value and eventually penalizes any shortage of data rate against data demand, γ is the adjustable parameter that sets the extent of penalty on data rate shortages, h is the set of equality constraint functions, g is the set of inequality constraint functions, $CH_i$ is the transmission channel of $i^{th}$ Wi-Fi access point, $CH_{i,TYPE}$ is the subset of available channels on the corresponding IEEE 802.11 standard.

Various algorithms may be applied to Equation 4 to obtain solutions of the MINLP. However, the solution of Equation 4 might be computationally challenging due to the time constant of the network dynamics and due to discrete and non-convex nature of the problem for such complex processes. Therefore, in an embodiment, optimization module 218 employs global MINLP solver algorithms that provide higher probability of obtaining the best solution through evaluating the objective function a higher number of times within the constraints. A significant drawback of the global solvers is the computational load in the case of real time implementations at high frequency control actions. However, the global solvers provide significant contribution when networks get denser.

In another embodiment, optimization module 218 solves the MINLP through heuristic algorithms which select a subset of the decision variables for dimensionality reduction in order to speed up the computations in order to prevent losing potential improvement directions in the optimization.

The formulation in Equation 4 is also applicable when external Wireless Local Area Networks (WLANs) that are the source of disturbance to the system exist. Since manipulation of these networks is not possible, optimization module 218 adjusts accessible Wi-Fi access points of plurality of Wi-Fi access points 102A-102N for the best performance. A primary criterion for algorithm selection is the current cluster traffic which is estimated from download tracker 212 data. Once broadcast trends pertaining to a Wi-Fi access point do not change significantly, there is no need to solve Equation 4 with a global optimization algorithm. In such cases, the current network variables are used as a warm start for the solution of Equation 4 using a local solver and only channel profile within the neighbourhood of the initial guess is scanned for the real-time implementation. On the other hand, when the network is relatively not so busy, a global algorithm is used to determine the next channel selection policy.

The local solvers also include the heuristic algorithms that consider a subset of decision variables for problem complexity reduction with a trade-off from global optimality. For instance, Cloud Branching algorithm utilizes dual degeneracy in order to decrease the branching. Relaxation Enforced Neighbourhood Search (RENS) is another heuristic algorithm that combines the solution of Mixed-Integer Programming (MIP) and Linear programming (LP) for the solution of MINLPs. Also, Shift and Propagate algorithm heuristically solves the MINLP problem without LP relaxation. Cloud Branching algorithms and their derivatives are likely to provide more cost-effective solutions with network tuned parameters in the solver.

Thus, the solution of Equation 4 in real-time is challenging, although heuristic algorithms deliver the solution with manageable speed at a satisfying accuracy. In order to improve the performance, the current channel assignment from the solution of Equation 4 delivers the initial guess for the solution of the problem for the next sample time. If there is no significant change in the network, the initial guess delivers the updated solution also. The weakness of the heuristic algorithms is decreased by using a global solver, when the cloud is computationally available and the network is comparatively not so busy.

Further, Equation 4 considers the dynamic horizon, making use of future data download forecasts. Once the demand forecast is available, a reliable and adaptive horizon of objective minimization is implemented on the performance equation. Thus, in addition to current network conditions, future dynamics of the network is included as well, enabling the probability of successful transmission attempts in the overall horizon and reducing the frequency of the control actions. The frequency of control actions is adaptive as it is a function of network dynamics and cloud computation limitations.

Once the channels are assigned, SINR of individual client devices of plurality of client devices 108A-108N determine the maximum data rate that may sometimes be inefficient due to the nature of the modulation. Data rate is usually a stepwise function of SINR, resulting in inefficient SINR increase between specific SINR values.

Optimization module 218 then performs a second optimization step of the two-step optimization process to reduce the transmit power of Wi-Fi access point 102A.

The optimization problem defined to reduce the transmission power of Wi-Fi access point 102A is as follows:

$$\underset{P_i}{\text{Max}} \sum_{j=1}^{STA_i} DR(i, j) \quad (5)$$

s.t.

$$P_{i,min} \leq P_i \leq P_{i,max}$$

$$DR(i, j) \leq f_{SINR-DR}(SINR_{STAs-APs}(i, j), \text{TYPE})$$

where $P_i$ is the transmit power of $i^{th}$ Wi-Fi access point, $P_{i,max}$ is the maximum transmission power and $P_{i,min}$ is the minimum transmission power.

A data rate increase ensures the same data rate even at the worst case in Equation 5. Further, Equation 5 exploits any inefficient power transmission, assuring predetermined data rate, DR(i, j), from the solution of Equation 5.

Once the optimization is performed, optimization module 218 performs an uncertainty evaluation of a network from a client device 108A of plurality of client devices 108A-108N to Wi-Fi access point 102A to optimize the settings of Wi-Fi access point 102A. For example, the uncertainty evaluation may be a sudden connection loss due to a channel switch. Thus, an optimal operating channel selection and an optimal transmit power derived for Wi-Fi access point 102A using the one or more network variables, backhaul limits and the download behavior, allow Wi-Fi access point 102A to operate at real-time optimal performance.

Figure 3:
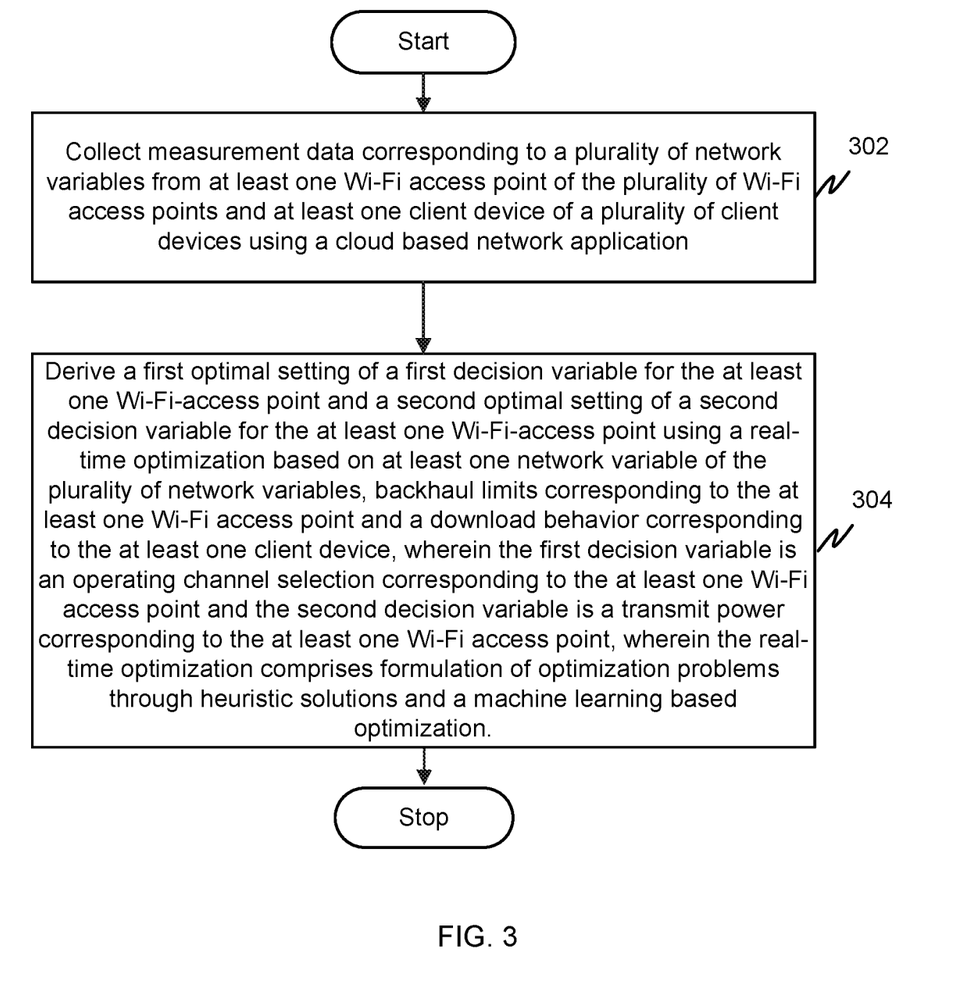
FIG. 3 illustrates a flowchart of a method for managing a plurality of Wi-Fi access points using an A-SDN in accordance with an embodiment of the invention.

FIG. 3 illustrates a flowchart of a method for managing plurality of Wi-Fi access points 102A-102N using A-SDN 104 in accordance with an embodiment of the invention.

At step 302, measurement data corresponding to plurality of network variables are collected by real-time monitoring module 106 from plurality of Wi-Fi access points 102A-102N and plurality of client devices 108A-108N using a CBN application. Step 302 is further described in detail in conjunction with FIG. 4.

Backhaul detector 210 of A-SDN module 112 detects backhaul limits associated with Wi-Fi access point 102A. Further, download tracker 212 tracks a download behavior associated with plurality of client devices 108A-108N as a function of time in order to upload this information to cloud server 110 for later analysis through integration with a network adapter of a corresponding client device.

Machine learning model 214 of A-SDN module 112 extracts download behavior or patterns associated with plurality of client devices 108A-108N from download tracker 212 that includes historical data. Machine learning model 214 clusters and forecasts the elements based on the extracted download behavior or patterns for optimization problem formulations.

Thereafter, at step 304, optimization module 218 of A-SDN module 112 derives optimal operating channels for Wi-Fi access point 102A and an optimal transmit power for Wi-Fi access point 102A based on the one or more network variables from clustering module 208, backhaul limits corresponding to Wi-Fi access point 102A from backhaul detector 210 and the download behavior or patterns of the one or more client devices of plurality of client devices from machine learning model 214 including the forecasted data from forecasting module 216, using a two-step optimization process. The two-step optimization process is performed through heuristic solutions of an optimization problem formulated as a MINLP and a machine learning based optimization.

In order to derive the optimal operating channels for Wi-Fi access point 102A, an optimization problem is formulated using a maximum data rate from Wi-Fi access point 102A to a client device of plurality of client devices 108A-108N at a particular time, a data demand of the client device from Wi-Fi access point 102A, a backhaul limit corresponding to Wi-Fi access point 102A, a Heaviside step function, an adjustable parameter, a set of equality constraint functions, a set of inequality constraint functions, a transmission channel of Wi-Fi access point 102A and a subset of available channels on corresponding IEEE 802.11 standard.

The maximum data rate is calculated using SINR corresponding to the client device connected to Wi-Fi access point 102A and a stepwise function that relates the SINR to the corresponding data rate for a particular IEEE 802.11 standard. Further, the SINR for the client device is calculated using RSSI from Wi-Fi access point 102A and a fractional bandwidth overlap between transmission channels of Wi-Fi access point 102A and a Wi-Fi access point 102B of plurality of Wi-Fi access points 102A-102N.

Further, in order to reduce a transmission power of Wi-Fi access point 102A, an optimization problem is formulated using the SINR of a client device of plurality of client devices 108A-108N and a maximum data rate from Wi-Fi access point 102A to the client device.

Figure 5:
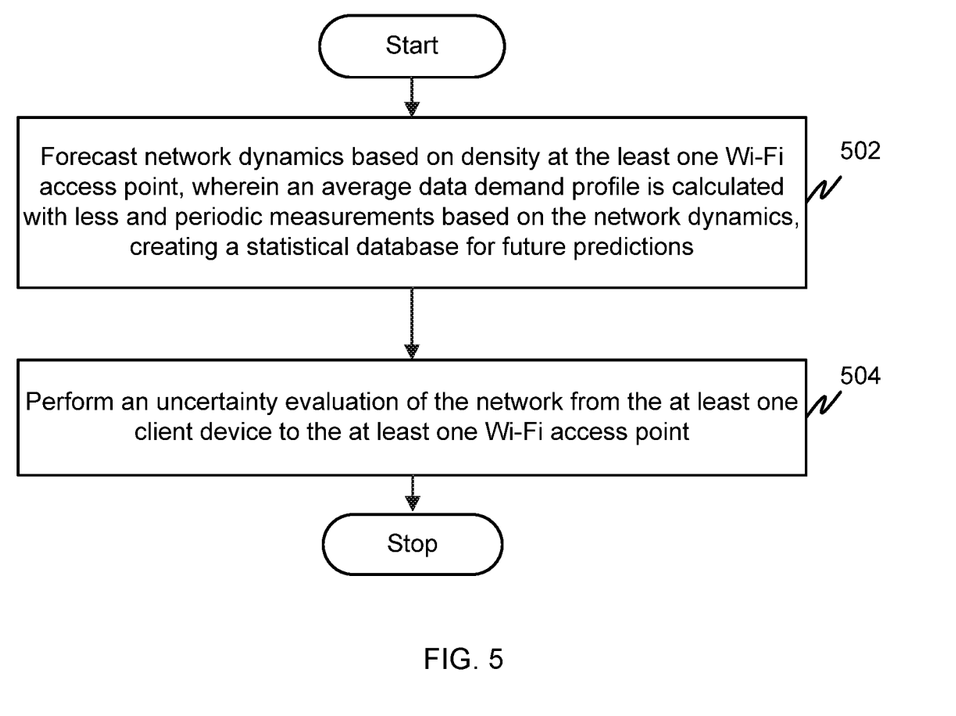
FIG. 5 illustrates a flowchart of a method for performing a real-time optimization for one or more Wi-Fi access points in accordance with an embodiment of the invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

Step 304 is further described in detail in conjunction with FIG. 5.

Figure 4:
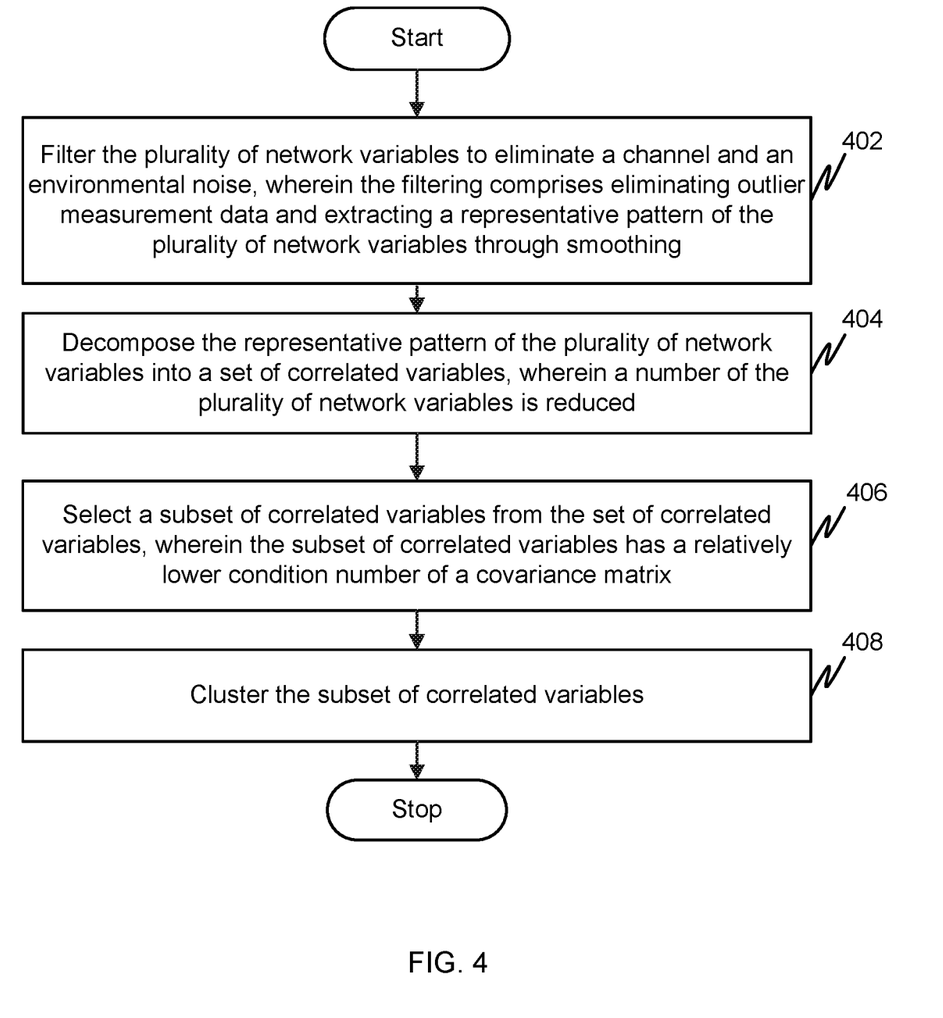
FIG. 4 illustrates a flowchart of a method for collecting measurement data corresponding to a plurality of network variables from a plurality of Wi-Fi access points and a plurality of client devices in accordance with an embodiment of the invention.

FIG. 4 illustrates a flowchart of a method for collecting measurement data corresponding to the plurality of network variables collected from plurality of Wi-Fi access points 102A-102N and plurality of client devices 108A-108N in accordance with an embodiment of the invention.

At step 402, the plurality of network variables are filtered using filtering module 206 to eliminate a channel and an environmental noise. The step of filtering eliminates outlier measurement data and extracts a representative pattern of the plurality of network variables through smoothing.

After extracting the representative pattern, at step 404, the representative pattern of the plurality of network variables is decomposed into a set of correlated variables. Thus, a number of the plurality of network variables is reduced.

At step 406, a subset of correlated variables is then selected from the set of correlated variables. The subset of correlated variables has a relatively lower condition number of a covariance matrix. Thereafter, at step 408, the subset of correlated variables is clustered using clustering module 208.

FIG. 5 illustrates a flowchart of a method for performing the real-time optimization for Wi-Fi access point 102A in accordance with an embodiment of the invention.

At step 502, forecasting module 216 present in A-SDN module 112 forecasts network dynamics based on density at Wi-Fi access point 102A, wherein an average data demand profile is calculated with less and periodic measurements based on the network dynamics and a statistical database is created for future predictions. Forecasting module 216 further employs interference minimization as a suboptimal approach due to limited channel availability as high demands might concentrate on the overlapping bands, resulting in inefficient use of available channels. Thus, forecasting is essential as the network setting change has a significant cost and an implemented set of settings should sustain a satisfactory network performance for a certain amount of time. The probable actions are calculated based on historical network measurements and structure.

Once the real-time optimization for the decision variables are performed, at step 504, optimization module 218 performs an uncertainty evaluation of the network from the one or more client devices to Wi-Fi access point 102A.

The invention utilizes an adaptive software defined network (A-SDN) algorithm for remote management and control of Wi-Fi access points through cloud based mechanisms that include filtering, data mining, clustering, machine learning and dynamic optimization.

The A-SDN acts as a centralized layer that captures improvement direction and optimal settings for the Wi-Fi access points based on online measurements, data transaction demand and forecasts, network capabilities, uncertainties and disturbances in a Wi-Fi network. The optimal settings are derived for the Wi-Fi access points through heuristic solution of a Mixed Integer Nonlinear Programming (MINLP) and a machine learning based optimization. Thus, the optimization results in reduced power consumption, increased throughput and improved data traffic management.

Once the optimal settings are derived, the A-SDN updates typical Wi-Fi access point settings such as the transmit power and channels in use, to improve data transfer rate and battery efficiency, despite internal and external disturbances in the network. In order to calculate the optimal setting profiles, data mining techniques are applied on network measurements to determine the effect of a decision variable on the performance. The cost of changing parameter settings, demand forecast and user inherent limits that is, backhaul are also taken into consideration. The A-SDN of the invention primarily focuses on the adjustment of operating channel and transmit power level of Wi-Fi access points to maximize the throughput for a particular data demand from users.

Further, the A-SDN utilizes a semi-empirical model and a machine learning model for optimizing overall performance of the Wi-Fi access points. The A-SDN utilizes the machine learning model that is derived from data mining techniques on network variables both at nominal operating conditions and perturbed operating conditions for determining the impact of a setting associated with the network variables for the Wi-Fi access points. The A-SDN utilizes the semi-empirical model for applications that require extrapolation capability considerations.

Moreover, the A-SDN initiates a re-optimization process by determining the changes in data transfer rates, network management policy and measurable and immeasurable disturbances in addition to reducing the data transfer cycle. Thus, the Wi-Fi access points are enabled to operate at real-time optimal performance.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for managing a plurality of Wi-Fi access points using a cloud based adaptive software defined network (A-SDN), the method comprising:
    collecting, by one or more processors, measurement data corresponding to a plurality of network variables from at least one Wi-Fi access point of the plurality of Wi-Fi access points and at least one client device of a plurality of client devices using a cloud based network application;
    deriving, by one or more processors, a first optimal setting of a first decision variable for the at least one Wi-Fi-access point and a second optimal setting of a second decision variable for the at least one Wi-Fi-access point using a real-time optimization based on at least one network variable of the plurality of network variables, backhaul limits corresponding to the at least one Wi-Fi access point and a download behavior corresponding to the at least one client device, wherein the first decision variable is an operating channel selection corresponding to the at least one Wi-Fi access point and the second decision variable is a transmit power corresponding to the at least one Wi-Fi access point; and
    wherein the real-time optimization comprises formulation of optimization problems through heuristic solutions and a machine learning based optimization;

wherein collecting the measurement data further comprises:
filtering, by one or more processors, the plurality of network variables to eliminate a channel and an environmental noise, wherein the filtering comprises eliminating outlier measurement data and extracting a representative pattern of the plurality of network variables through smoothing;
decomposing, by one or more processors, the representative pattern of the plurality of network variables into a set of correlated variables, wherein a number of the plurality of network variables is reduced;
selecting, by one or more processors, a subset of correlated variables from the set of correlated variables, wherein the subset of correlated variables has a relatively lower condition number of a covariance matrix; and
clustering, by one or more processors, the subset of correlated variables.

2. The method according to claim 1, wherein collecting the measurement data comprises adapting, by one or more processors, a frequency of import of the measurement data corresponding to the plurality of network variables based on a transition profile of the plurality of network variables and environmental disturbance associated with the plurality of Wi-Fi access points.

3. The method according to claim 1, wherein the subset of correlated variables is clustered based on one of a location of a network element, an access point property and a network element volatility.

4. The method according to claim 1, wherein a network variable is one of an access point average access delay, an average access delay for each access category, an associated client device count, a channel utilization, a transmitted fragment count, a group addressed transmitted frame count, a failed count, a retry count, a multiple retry count, a frame duplicate count, a request to send (RTS) count, an RTS failure count, an acknowledge (ACK) failure count, a received fragment count, a group addresses received frame count, a frame check sequence (FCS) error count, a transmitted frame count, a received signal strength (RSSI) on a client device and a total data transfer.

5. The method according to claim 1, wherein the real-time optimization is a two-step optimization process, wherein a first optimization step of the two-step optimization process is used for deriving the first optimal setting of the first decision variable for the at least one Wi-Fi access point; and
wherein the first optimization step comprises formulating, by one or more processors, an optimization problem using a maximum data rate from a Wi-Fi access point of the plurality of Wi-Fi access point to a client device of the plurality of client devices at a particular time, a data demand of the client device from the Wi-Fi access point, a backhaul limit corresponding to the Wi-Fi access point, a Heaviside step function, an adjustable parameter, a set of equality constraint functions, a set of inequality constraint functions, a transmission channel of the Wi-Fi access point and a subset of available channels on corresponding IEEE 802.11 standard.

6. The method according to claim 5, wherein the maximum data rate is calculated using SINR corresponding to the client device connected to the Wi-Fi access point and a stepwise function that relates the SINR to the corresponding data rate for a particular IEEE 802.11 standard.

7. The method according to claim 6, wherein the SINR for the client device is calculated using RSSI from the Wi-Fi access point and a fractional bandwidth overlap between transmission channels of the Wi-Fi access point and a second Wi-Fi access point of the plurality of Wi-Fi access points.

8. The method according to claim 5, wherein a second optimization step of the two-step optimization process is used for deriving the second optimal setting of the second decision variable for the at least one Wi-Fi access point.

9. The method according to claim 8, wherein the second optimization step comprises formulating, by one or more processors, an optimization problem to reduce transmit power of a Wi-Fi access point of the plurality of Wi-Fi access points using the SINR of a client device of the plurality of client devices and a maximum data rate from a Wi-Fi access point of the plurality of Wi-Fi access point to the client device.

10. The method according to claim 1, wherein an optimization problem is formulated as a Mixed Integer Nonlinear Programming (MINLP) problem.

11. The method according to claim 1 further comprises recalculating, by one or more processors, an optimal setting for the at least one Wi-Fi access point based on one of changes in a data transfer rate, changes in a network management policy, or measurable and immeasurable disturbances.

12. A system for managing a plurality of Wi-Fi access points using a cloud based adaptive software defined network (A-SDN), the system comprising:
a memory;
a processor communicatively coupled to the memory, wherein the processor is configured to:
collect measurement data corresponding to a plurality of network variables from at least one Wi-Fi access point of the plurality of Wi-Fi access points and at least one client device of a plurality of client devices using a cloud based network application;
derive a first optimal setting of a first decision variable for the at least one Wi-Fi-access point and a second optimal setting of a second decision variable for the at least one Wi-Fi-access point using a real-time optimization based on at least one network variable of the plurality of network variables, backhaul limits corresponding to the at least one Wi-Fi access point and a download behavior corresponding to the at least one client device, wherein the first decision variable is an operating channel selection corresponding to the at least one Wi-Fi access point and the second decision variable is a transmit power corresponding to the at least one Wi-Fi access point; and
wherein the real-time optimization comprises formulation of optimization problems through heuristic solutions and a machine learning based optimization;
wherein the real-time optimization is a two-step optimization process;
wherein a second optimization step of the two-step optimization process is used for deriving the second optimal setting of the second decision variable for the at least one Wi-Fi access point; and
wherein the processor is configured to formulate an optimization problem to reduce transmit power of a Wi-Fi access point of the plurality of Wi-Fi access points using the SINR of a client device of the plurality of client devices and a maximum data rate from a Wi-Fi access point of the plurality of Wi-Fi access point to the client device.

13. The system according to claim 12, wherein the processor is configured to adapt a frequency of import of the measurement data corresponding to the plurality of network variables based on a transition profile of the plurality of network variables and environmental disturbance associated with the plurality of Wi-Fi access points.

14. The system according to claim 12, wherein the processor is configured to:
   filter the plurality of network variables to eliminate a channel and an environmental noise, wherein the filtering comprises eliminating outlier measurement data and extracting a representative pattern of the plurality of network variables through smoothing;
   decompose the representative pattern of the plurality of network variables into a set of correlated variables, wherein a number of the plurality of network variables is reduced;
   select a subset of correlated variables from the set of correlated variables, wherein the subset of correlated variables has a relatively lower condition number of a covariance matrix; and
   cluster the subset of correlated variables.

15. The system according to claim 12, wherein the processor is further configured to:
   forecast network dynamics based on density at the least one Wi-Fi access point, wherein an average data demand profile is calculated with less and periodic measurements based on the network dynamics, creating a statistical database for future predictions; and
   perform an uncertainty evaluation of the network from the at least one client device to the at least one Wi-Fi access point.

16. The system according to claim 12, wherein a first optimization step of the two-step optimization process is used for deriving the first optimal setting of the first decision variable for the at least one Wi-Fi access point.

17. The system according to claim 16, wherein the processor is configured to formulate an optimization problem using a maximum data rate from a Wi-Fi access point of the plurality of Wi-Fi access point to a client device of the plurality of client devices at a particular time, a data demand of the client device from the Wi-Fi access point, a backhaul limit corresponding to the Wi-Fi access point, a Heaviside step function, an adjustable parameter, a set of equality constraint functions, a set of inequality constraint functions, a transmission channel of the Wi-Fi access point and a subset of available channels on corresponding IEEE 802.11 standard.

18. The system according to claim 12, wherein the processor is further configured to recalculate an optimal setting for the at least one Wi-Fi access point based on one of changes in a data transfer rate, changes in a network management policy, or measurable and immeasurable disturbances.

19. A method for managing a plurality of Wi-Fi access points using a cloud based adaptive software defined network (A-SDN), the method comprising:
   collecting, by one or more processors, measurement data corresponding to a plurality of network variables from at least one Wi-Fi access point of the plurality of Wi-Fi access points and at least one client device of a plurality of client devices using a cloud based network application;
   deriving, by one or more processors, a first optimal setting of a first decision variable for the at least one Wi-Fi-access point and a second optimal setting of a second decision variable for the at least one Wi-Fi-access point using a real-time optimization based on at least one network variable of the plurality of network variables, backhaul limits corresponding to the at least one Wi-Fi access point and a download behavior corresponding to the at least one client device, wherein the first decision variable is an operating channel selection corresponding to the at least one Wi-Fi access point and the second decision variable is a transmit power corresponding to the at least one Wi-Fi access point; and
   wherein the real-time optimization comprises formulation of optimization problems through heuristic solutions and a machine learning based optimization;
   wherein deriving the first optimal setting and the second optimal setting using the real-time optimization comprises:
   forecasting, by one or more processors, network dynamics based on density at the least one Wi-Fi access point, wherein an average data demand profile is calculated with less and periodic measurements based on the network dynamics, creating a statistical database for future predictions; and
   performing, by one or more processors, an uncertainty evaluation of the network from the at least one client device to the at least one Wi-Fi access point.

20. The method according to claim 19, wherein the real-time optimization is a two-step optimization process;
   wherein a first optimization step of the two-step optimization process is used for deriving the first optimal setting of the first decision variable for the at least one Wi-Fi access point; and
   wherein the first optimization step comprises formulating, by one or more processors, an optimization problem using a maximum data rate from a Wi-Fi access point of the plurality of Wi-Fi access point to a client device of the plurality of client devices at a particular time, a data demand of the client device from the Wi-Fi access point, a backhaul limit corresponding to the Wi-Fi access point, a Heaviside step function, an adjustable parameter, a set of equality constraint functions, a set of inequality constraint functions, a transmission channel of the Wi-Fi access point and a subset of available channels on corresponding IEEE 802.11 standard.

21. The method according to claim 20, wherein the maximum data rate is calculated using SINR corresponding to the client device connected to the Wi-Fi access point and a stepwise function that relates the SINR to the corresponding data rate for a particular IEEE 802. 11 standard.

22. The method according to claim 21, wherein the SINR for the client device is calculated using RSSI from the Wi-Fi access point and a fractional bandwidth overlap between transmission channels of the Wi-Fi access point and a second Wi-Fi access point of the plurality of Wi-Fi access points.

23. The method according to claim 20, wherein a second optimization step of the two-step optimization process is used for deriving the second optimal setting of the second decision variable for the at least one Wi-Fi access point;
   wherein the second optimization step comprises formulating, by one or more processors, an optimization problem to reduce transmit power of a Wi-Fi access point of the plurality of Wi-Fi access points using the SINR of a client device of the plurality of client devices and a maximum data rate from a Wi-Fi access point of the plurality of Wi-Fi access point to the client device.

24. The method according to claim 19, wherein an optimization problem is formulated as a Mixed Integer Nonlinear Programming (MINLP) problem.

25. The method according to claim 19 further comprises recalculating, by one or more processors, an optimal setting for the at least one Wi-Fi access point based on one of changes in a data transfer rate, changes in a network management policy, or measurable and immeasurable disturbances.

* * * * *